US006485918B1

(12) United States Patent
Schermer et al.

(10) Patent No.: US 6,485,918 B1
(45) Date of Patent: Nov. 26, 2002

(54) METHOD AND APPARATUS FOR INCUBATION OF A LIQUID REAGENT AND TARGET SPOTS ON A MICROARRAY SUBSTRATE

(75) Inventors: Mack J. Schermer, Belmont, MA (US); C. Todd Lombardo, Lowell, MA (US); Robert Milkowski, Groton, MA (US); Donald Regan, Boxborough, MA (US); Paul St. Cyr, Middleton, MA (US)

(73) Assignee: Packard BioScience Corporation, Meriden, CT (US)

( * ) Notice: Subject to any disclaimer, the term of this patent is extended or adjusted under 35 U.S.C. 154(b) by 0 days.

(21) Appl. No.: 09/897,621

(22) Filed: Jul. 2, 2001

(51) Int. Cl.$^7$ .................................. C12Q 1/68
(52) U.S. Cl. ................ 435/6; 435/283.1; 435/286.7; 435/303.3; 435/305.3; 435/305.4; 435/287.1; 422/58; 422/102; 422/104; 422/940; 422/942; 436/518; 436/524; 366/267
(58) Field of Search .................. 422/58, 102, 104, 422/940, 942; 435/283.1, 6, 286.7, 299.2, 303.3, 305.3, 305.4, 7.1, 287.1, 99; 436/46, 174, 807, 518, 524; 366/267

(56) References Cited

U.S. PATENT DOCUMENTS

| 5,100,775 A | 3/1992 | Smyczek et al. ............... 435/6 |
| 5,360,741 A | 11/1994 | Hunnell ...................... 435/290 |
| 5,364,790 A | * 11/1994 | Atwood et al. ........... 435/287.2 |
| 5,436,129 A | 7/1995 | Stapleton ...................... 435/6 |
| 5,443,791 A | 8/1995 | Cathcart et al. ............... 422/65 |
| 5,466,603 A | 11/1995 | Meehan et al. ........... 435/285.1 |
| 5,503,805 A | 4/1996 | Sugarman et al. ........... 422/131 |
| 5,578,832 A | 11/1996 | Trulson et al. ............ 250/458.1 |
| 5,595,707 A | 1/1997 | Copeland et al. .............. 422/64 |
| 5,646,039 A | 7/1997 | Northrup et al. ............ 435/290 |
| 5,650,327 A | 7/1997 | Copeland et al. .............. 436/46 |
| 5,654,200 A | 8/1997 | Copeland et al. .............. 436/46 |
| 5,681,741 A | * 10/1997 | Atwood et al. .......... 435/287.2 |

(List continued on next page.)

FOREIGN PATENT DOCUMENTS

EP    0 933 126 A1    8/1999

OTHER PUBLICATIONS

"Frame–Seal Incubation Chamber; Vapor–tight slide sealing chambers for FISH, in situ, PCR or PRINS" MJ Research, Inc., Internet: *http://www.mjr.com/html/consumables/microplates/insitu* frame.html.

"Affymetrix—GeneChip Probe Array Synthesis," Affymetrix Technology, Internet: *http://www.affymetrix.com/technology/tech* probe.content.html.

"Affymetrix Products: Hybridization Oven," Affymetrix Products, Internet: *http://www.affymetrix.com/products/ins.oven.content.html*.

"Affymetrix Products: GeneChip ® Fluidies Station," Internet: *http://www.affymetrix.com/products/ins.fluid.content.html*.

Breakthrough Automation, Internet: *http://www.ventanadiscovery.com/discovery.html*.

"Fully–automated Kinetic–mode Hybridization of Microarray Glass Slides," Internet: *http://www.ventanadiscovery.com/poster.html*.

(List continued on next page.)

*Primary Examiner*—Christopher L. Chin
*Assistant Examiner*—Gary Counts
(74) *Attorney, Agent, or Firm*—Hale and Dorr LLP (57) ABSTRACT

A method and apparatus for incubating a liquid reagent with target spots on a microarray substrate. A deformable cover is placed over the surface of the microarray substrate having the target spots with the liquid reagent between the microarray substrate and the deformable cover, and a device is used to apply a force to the deformable cover.

28 Claims, 4 Drawing Sheets

U.S. PATENT DOCUMENTS

| | | | |
|---|---|---|---|
| 5,804,141 A * | 9/1998 | Chianese et al. | 422/63 |
| 5,807,522 A | 9/1998 | Brown et al. | 422/50 |
| 5,856,174 A | 1/1999 | Lipshutz et al. | 435/286.5 |
| 5,895,915 A | 4/1999 | DeWeerd et al. | 250/234 |
| 5,910,288 A * | 6/1999 | Schembri et al. | 422/102 |
| 5,922,591 A | 7/1999 | Anderson et al. | 435/287.2 |
| 6,020,187 A | 2/2000 | Tam | 435/287.2 |
| 6,043,080 A | 3/2000 | Lipshutz et al. | 435/287.2 |
| 6,045,759 A | 4/2000 | Ford et al. | 422/103 |
| 6,050,719 A | 4/2000 | Winkler et al. | 366/144 |
| 6,101,946 A | 8/2000 | Martinsky | 101/494 |
| 6,103,196 A * | 8/2000 | Yassinzadeh et al. | 422/73 |
| 6,114,122 A | 9/2000 | Besemer et al. | 435/6 |
| 6,117,687 A | 9/2000 | Hugh | 436/183 |
| 6,140,044 A | 10/2000 | Besemer et al. | 435/6 |
| 6,165,778 A | 12/2000 | Kedar | 435/289.1 |
| 6,168,948 B1 | 1/2001 | Anderson et al. | 435/287.2 |
| 6,197,595 B1 | 3/2001 | Anderson et al. | 436/180 |
| 6,238,910 B1 | 5/2001 | Custance et al. | 435/287.2 |
| 6,258,593 B1 * | 7/2001 | Schembri et al. | 435/287.1 |
| 6,267,927 B1 | 7/2001 | Pomar Longedo et al. | 422/65 |

OTHER PUBLICATIONS

"Genomic Solutions: GenTAC Hybridization Station," Internet: *http://www.genomicsolutions.com/products/bio/hyb.html*.

Microarray Products, "A Suite of Microarray Products for High–throughput Gene Expression Analysis," Internet: *http://www.apbiotech.com/stiboasp/showmodule.asp?n-moduleid=163599*.

SuperMicroarray Substrates, "TeleChem International, Inc.//Araylt.com; Manufacturers of Araylt Brand Biochip Products and Distributors of Fine Chemicals; Araylt Super Microarray Substrates Handbook," Internet: *http://www.arrayit.com/Chem_Arrayi . . . /supermicorarray_substrates.htm*.

Automated Slide Processor User's Guide, "Chapter 1—Introduction to the ASP Instrument".

"ProBlot 12 Hybridization Oven," Internet: *http://www.labnetlink.compb12.htm*.

Product Information, Corning Microarray Technologies, "CMT—Hybridization Chamber," Internet: *http://www.corning.com/CMT/products//hybridization.asp*.

TeleChem International, Inc.//Araylt.com, Manufacturers of Araylt Brand BioChip Products and Distributors of Fine Chemicals, "Araylt Hybridization Casette Handbook," Internet: *http://www.arrayit.com/ChemArray/Arrayit Brand Pro . . . /hyb cassette.htm*.

Stapleton et al, "Controlling Flow Characteristics in Ultrathin Chambers," BioMedical Products, Apr. 2001, Calmers Scientific Publishers.

Schena et al., "Quantitative Monitoring of Gene Expression Patterns with a Complementary DNA Microarray," Science, vol. 270, Oct. 20, 1995, pp. 467–470.

MacBeath et al., "Printing Proteins as Microarrays for High–Throughput Function Determination," Science, vol. 289, Sep. 8, 2000, pp. 1760–1763.

Ekins et al., "Multianalyte Microspot Immunoassay—Microanalytical "Compact Disk" of the Future," Clinical Chemistry, vol. 37, No. 11, 1991, pp. 1955–1967.

Hirschhorn et al., "SBE–TAGS: An Array–Based Method for Efficient Single–Nucleotide Polymorphism Genotyping," PNAS, vol. 97, No. 22, Oct. 24, 2000, pp. 12164–12169.

AP Biotech, ASP: Benefits, Internet: *http://www.apbiotech.com/application/microarray/ASP_benetifs.htm*.

Sziele et al., "Adaptation of a Microdrop Injector to Sampling in Capillary Eelctrophoresis," Journal of Chromatography, vol. 669, pp. 254–258, Elsevier Science B.V., 1994.

Schober et al., "Accurate High–Speed Liquid Handling of Very Small Biological Samples," BioTechniques, vol. 15, No. 2, pp. 324–329.

Microarray Hybridization Protocol, Internet: *http://lgsun.grc.nia.nih.gov/cDNA/protocol.html*.

Grace Bio Labs, Internet: *http://www.gracebio.com/products.html*.

Schena, "Microarray BioChip Technology," copyright 2000 Eaton Publishing.

Schena, "DNA Microarrays—A Practical Approach," copyright 1999 Oxford University Press.

\* cited by examiner

METHOD AND APPARATUS FOR INCUBATION OF A LIQUID REAGENT AND TARGET SPOTS ON A MICROARRAY SUBSTRATE

FIELD

The present invention relates generally to methods and systems for hybridizing and/or incubating microarrays.

BACKGROUND OF THE INVENTION

Figure 1A:
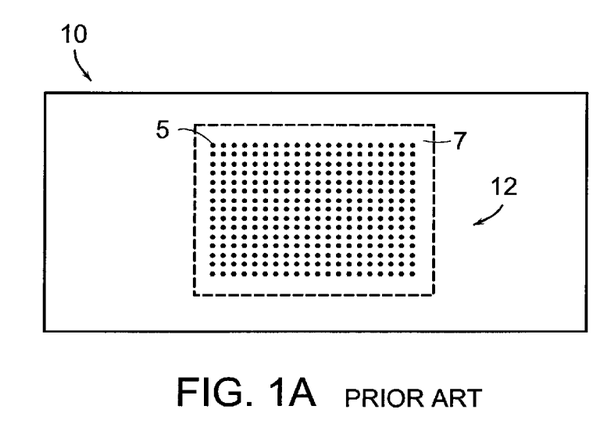
FIG. 1A is a top view of a typical microarray.

Microarrays are arrays of very small samples of purified DNA, protein, antibody, or small molecule target material arranged as a grid of up to hundreds or thousands of small spots immobilized onto a solid substrate. FIG. 1A is a top view of a typical microarray. The microarray substrate 10 is typically coated or derivatized uniformly over its top surface 12 to afford chemical or electrostatic binding of small droplets of the target material in solution. The droplets of target solution dry and bind to the top surface 12 of the substrate 10, forming target spots 5 that are is generally from tens to hundreds of microns in diameter. The target spots 5 form a spotted area 7 on the top surface 12 of the substrate 10. The spotted area 7 in the substrate 10 of FIG. 1A is rectangular and has a broken line drawn around it.

A microarray can be used to detect complementary probes. The immobilized target spots on the microarray substrate are exposed to complementary DNA, protein, antigen, or chemical probe samples in liquid solution. The probe materials in solution, which are generally derived from cells, bodily fluids, or combinatorial chemistry libraries, are labeled with fluorescent dyes. The probe materials bind at complementary target spots on the microarray, and the dyes allow for subsequent detection and measurement of the relative concentration of each species of complementary probe material at each target spot. Other detection schemes may be used aside from fluorescence, such as the use of radioactive markers, chemiluminescence, and surface plasmon resonance (SPR).

In some references relating to microarrays, the nomenclature for the immobilized spot material on the microarray substrate (called "target" material here) and the solution applied to the spots for selective binding assays (called "probe" material here) is reversed.

Through a process called hybridization, DNA probe material in solution selectively binds to target spots on the microarray substrate only where complementary bonding sites occur. Similarly, labeled protein probe material only binds selectively to target spots with specific complementary bonding sites; this process is called affinity binding and incubation in protein and antibody assays. Selective reactions of smaller organic or inorganic chemicals (small molecules) to one another or to proteins or DNA can occur in the same way. DNA hybridization and the terminology associated with DNA microarrays will be used throughout this specification, but it is to be understood that the same processes and effects apply to these other types of microarrays.

After the reaction between the probe material and the target material is allowed to occur, quantitative scanning in a fluorescent microarray scanner produces a pixel map of fluorescent intensities. This fluorescent pixel map can be analyzed by special purpose quantitation algorithms to reveal the relative concentrations of the fluorescent probe materials at each target spot on the microarray, thus indicating the level of gene expression, protein concentration, or the like present in the cells from which the probe materials were extracted.

The microarray substrate is generally made of glass that has been treated chemically to provide for molecular attachment of the target spot samples of microarray target material. The substrate 10 can also be made of plastic, silicon, ceramic, metal, or other rigid material. The microarray substrate 10 is also generally of the same size and shape as a standard microscope slide, about 25 mm×75 mm×1 mm thick. The array area of target spots can extend to within about 1.5 mm of the edges of the substrate, although this array area can also be smaller. Typically, the target spots are approximately round. The target spot diameter can vary from about 50 microns to about 500 microns, depending on the dispensing or spotting technique used to apply the target spots to the microarray substrate. The center-to-center spacing between the target spots on the microarray substrate usually falls into the range of about 1.5 to 2.5 target spot diameters. The target spots are typically printed or "spotted" on the top surface of the substrate by pin-type spotting instruments which deposit droplets by a stamping process, where a small (<1 nanoliter) amount of liquid from the wetted end of the pin is transferred to the top surface of the substrate. Alternately, piezo-electric dispensers can dispense drops onto a substrate's activated surface (called the spotted area of the top surface here) in a manner similar to an ink-jet printer.

The protocols for producing the fluorescently labeled probe solutions can be fairly complex. For differential gene-expression DNA microarrays, exemplary probe preparation steps are:
  Tissue or cell isolation
  RNA extraction
  RNA purification
  Reverse transcription of RNA to cDNA
  Attachment of the fluorescent label to all species of DNA the solution
  Dye teminator cleanup
  Addition of buffer to attain desired volume, concentration, pH, etc.

A common type of microarray is used for analyzing differential gene expression. Labeled probe material is prepared from each of two or more tissues or cell types; the RNA/cDNA extracted from each tissue type is labeled with a different dye. Then, the two or more labeled probes are mixed together and applied in solution form to the microarray. The probe mixture is kept in intimate contact with the immobilized target spots on the microarray for some number of hours, typically at a temperature above ambient temperature, to allow the complementary strands of DNA to come into contact with one another and to bind. This process is generally called "incubation," and "hybridization" is used to refer to single-stranded DNA segments binding into a double-helix. In contrast, antibody-antigen assay incubation is often carried out at room temperature for times on the order of 5–60 minutes.

Figure 1B:
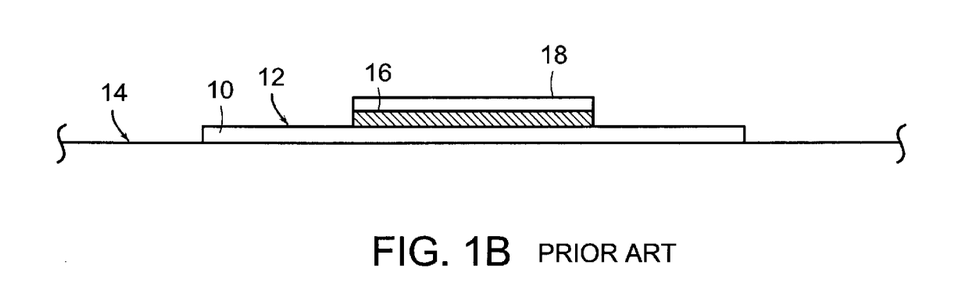
FIG. 1B is a side view of a prior art system used for incubating microarrays with liquid probe solution.

FIG. 1B shows a side view of a typical cover glass arrangement that has been used for reacting the probe material with target spots. In the arrangement of FIG. 1B, the microarray substrate 10 is placed on a work surface 14 with the top surface 12 of the microarray substrate 10 having the spotted area 7 facing up. A selected volume of liquid probe solution 16 is then placed as a thin layer on the top surface 12 where the spotted area 7 (not shown) is located, and a cover glass 18 is placed over the liquid probe solution 16. A typical volume of the liquid probe solution 16 is about 15–25 microliters. This small volume of liquid probe solution 16 is deposited on the spotted area 7 of the top surface 12 as a drop. The cover glass 18 placed on top of the drop of liquid probe solution 16 spreads the drop into a thin layer over the spotted area 7 of the top surface 12 with about the same dimensions as the cover glass 18. The layer of liquid probe solution 16 can be about 10–60 microns thick and is kept in place by the capillary effect of being sandwiched between two planar pieces of glass. The dimensions of the spotted area 7 on the top surface 12 and the cover glass 18 are usually smaller than the dimensions of the microarray substrate 10, but in some cases the spots, the cover glass 18 and the liquid probe solution 16 can cover the entire top surface 12 of the microarray substrate 10.

The microarray substrate 10 with liquid probe solution 16 and the cover glass 18 is then placed in a sealed chamber of some sort to prevent the probe from evaporating or drying during incubation. Specially designed hybridization chambers are available for this (a Telechem Hybridization Cassette, for example), but many researchers use common labware such as 50 ml centrifuge tubes or Copeland jars. Often, a laboratory wipe or other absorbent object soaked with water is placed into the hybridization chamber with the microarray and probe liquid to keep the humidity in the chamber near 100% to minimize drying of the probe liquid. Drying of the probe mixture leads to very high non-specific attachment of the fluorescent dye to the microarray, which in turn causes very high background fluorescent signals that may drown out the hybridization signals where drying has occurred.

The molecular event that causes a labeled molecule in the liquid probe solution 16 to bind to one of its immobilized complements on the top surface 12 requires that the two molecules be in intimate contact. With the cover glass method described in connection with FIG. 1B, diffusion is the only vehicle for molecular movement. In other methods, a stick-on cap can be affixed over a substrate with liquid probe solution, and then the liquid probe solution can be agitated during incubation by shaking the combination of the substrate and stick-on cap, or by pumping liquid to and from under the stick-on cap.

SUMMARY OF THE INVENTION

One embodiment of the invention is a method for incubating a liquid reagent with target spots on a first surface of a microarray substrate. In this embodiment, the liquid reagent is confined between a deformable cover and the surface of the substrate having the target spots. The deformable cover is then deformed by applying a force to the cover with a deflector. The force can vary in location of application, magnitude, or in a combination of magnitude and location of application. The deflector, which can be a roller, can apply a force to the deformable cover in different locations along the deformable cover, thus agitating the liquid reagent and aiding in incubation. Deformation of the deformable cover can be in either a top region or in a gasket of the cover.

In an alternative method for incubating reagents in accordance with the invention, a deformable cover is placed upon a mechanical support or a work surface. In one embodiment, the deformable cover is placed upside-down on the work surface. Liquid reagent is then placed on the deformable cover, either manually or automatically. The microarray substrate is then placed over the cover with the liquid reagent, thus forming a reaction chamber between the liquid reagent and the substrate. The microarray substrate and the deformable cover are then moved to agitate the liquid reagent. A force can be applied to the deformable cover with a deflector to agitate the liquid reagent in the reaction chamber. Upon application of the force, the deformable cover can deform to move the liquid reagent in the reaction chamber. Additionally, when the liquid reagent is placed in the cover, the amount of liquid reagent can be applied so that an air bubble remains within the reaction chamber upon application of the substrate over the deformable cover. Upon application of the force to the deformable cover, the air bubble can aid in the agitation of the liquid reagent.

Another embodiment of the invention is an apparatus for incubating a liquid reagent with target spots on a first surface of a microarray substrate. In this embodiment, the apparatus can include a deformable cover and a deflector. The deformable cover is adapted to seal the liquid reagent between the deformable cover and the first surface of the microarray substrate, thus forming a reaction chamber. The deflector is designed to apply a force to the deformable cover to agitate the liquid reagent within the reaction chamber.

Yet another embodiment of the invention is also an apparatus for incubating a liquid reagent with target spots on a first surface of a microarray substrate. In this embodiment, the cover includes a substantially rigid lid and a gasket that deforms more easily than the lid. A first actuator and a second actuator are used to apply forces to the cover, thus deforming the gasket of the cover. Upon alteration of the force produced by the first actuator and the force produced by the second actuator, the lid of the cover tilts, thus producing a flow of liquid reagent over the microarray substrate. This flow of liquid reagent can aid in the reaction during incubation. In one embodiment, the sum of the force produced by the first actuator and the force produced by the second actuator remains substantially constant as the two forces vary. In this manner, when one of the forces increases, the other force decreases by approximately the same magnitude. This substantially constant sum of the forces can ensure that a sufficient force remains on the cover to keep the seal formed between the gasket and the substrate so that liquid reagent does not escape during the incubation process.

DETAILED DESCRIPTION OF THE EMBODIMENTS OF THE INVENTION

The embodiments of the invention provide methods and devices for confining the liquid probe solution inside a cap that is attached to the microarray substrate. The cap can be a stick-on or clamped-on cap that allows positive-displacement agitation to agitate the liquid probe solution. The cap is deformed by the application of variable mechanical forces substantially normal to the microarray surface. The deformation can occur in the cap's top or gasket regions, or in both regions. Compressive deformation of the cap produces a localized reduction in volume within the cap, thus forcing the liquid probe solution to move away from the site of application of the force application.

The term "reaction" will be used throughout this specification to refer generally to hybridization, affinity binding and incubation, or any other type of reaction between probe material and target spots. In addition, the term "liquid reagent" or "liquid probe solution" will be broadly used throughout this specification to refer to solution having DNA probe material, labeled protein or immunoassay probe material.

Figure 2:
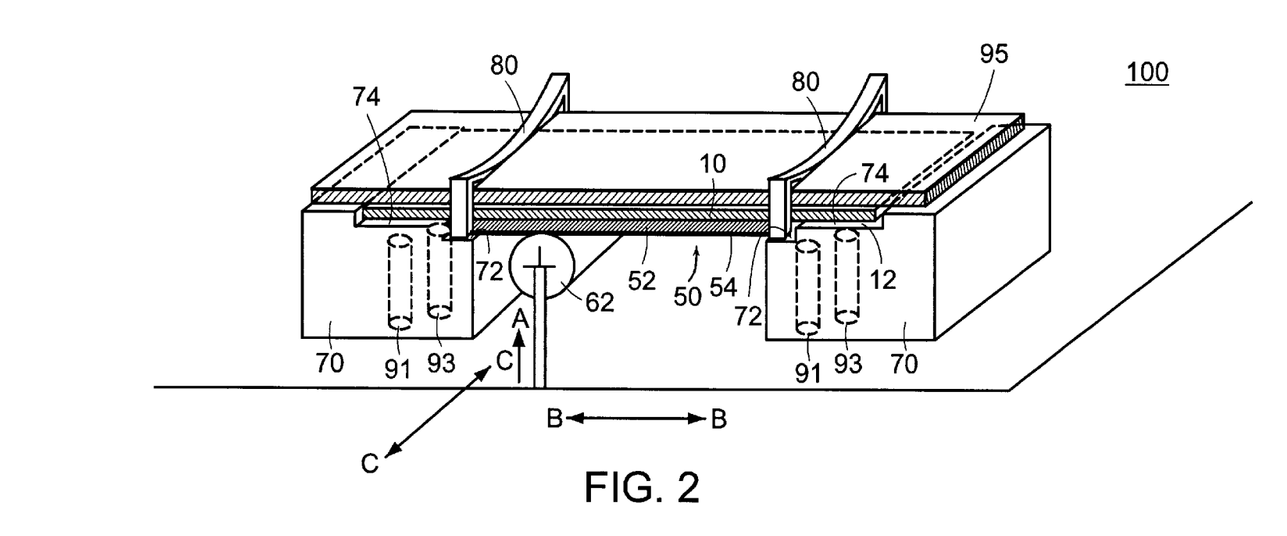
FIG. 2 is a perspective view of one embodiment of an apparatus for incubating a liquid reagent with a microarray.
Figure 3A:
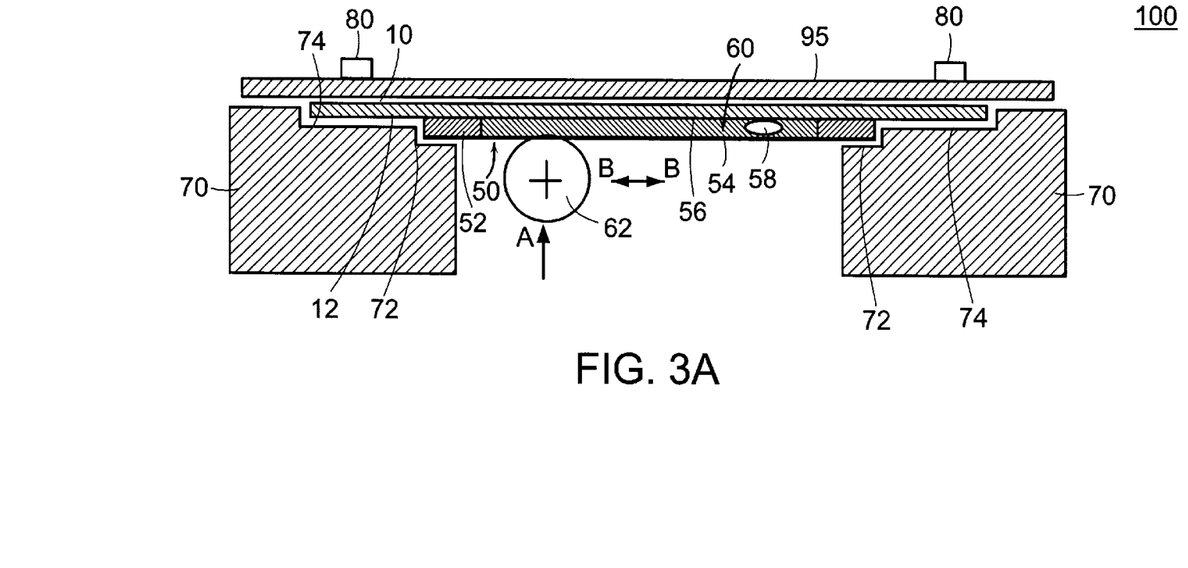
FIG. 3A is a side cross-sectional view of the embodiment of the apparatus of FIG. 2.
Figure 3B:
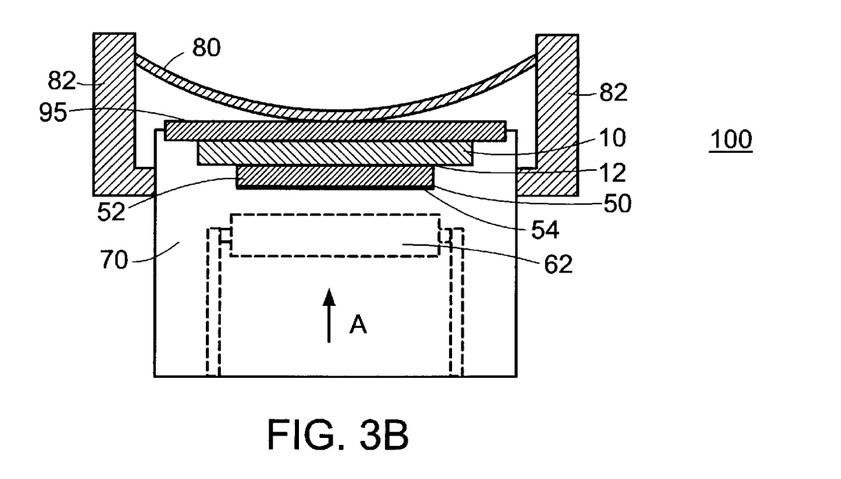
FIG. 3B is an end view of the embodiment of the apparatus of FIGS. 2 and 3A.

One embodiment of the apparatus 100 of the invention is depicted in FIGS. 2, 3A, and 3B. FIG. 2 is a perspective view of the embodiment, FIG. 3A is a side cross-sectional view, and FIG. 3B is an end view. This embodiment of the invention includes a stick-on cap or cover 50 and a deflector 62. The cover 50 can have a gasket region 52 and a top region 54 (see FIG. 3A). Either the gasket region 52 or top region 54 of the cover 50 can be deformable, or both regions 52, 54 can be deformable. The deflector 62 is a mechanical device that can be used to physically contact the cover 50 to deform the cover 50.

In operation, a volume of liquid reagent 56 is placed in the cover 50, and a microarray substrate 10 is placed on top of the liquid reagent-filled cover 50 with the top surface 12 (having spotted area 7) of the substrate 10 facing downward, toward the cover 50. The cover 50 can then be sealed onto the microarray substrate 10 by adhesive or mechanical clamping, or a combination of adhesive and clamping. The gasket region 52 of the cover 50 contacts the microarray substrate 10 in this embodiment, and a sealed reaction chamber 60 results in the space between the top surface 12 of the microarray substrate 10 and the cover 50.

Referring to FIG. 3A, the cover 50 can be slightly underfilled with liquid reagent 56 such that an air bubble 58 is left in the reaction chamber 60. After the cover 50 has been secured to the substrate 10 through clamping and/or adhesion, the substrate-cover assembly is brought into contact with the deflector 62, and a force is applied to the cover 50. In FIGS. 2, 3A, and 3B, the force applied by the deflector 62 has a component in the direction of arrow A, although the force can also have components in other directions. The application of the force to the cover 50 by the deflector 62 causes a deformation in the cover 50, which causes a localized volume change in the reaction chamber 60. The volume of the reaction chamber 60 in a small portion of the reaction chamber 60 under a millimeter-wide rectangle underneath the deflector 62, for instance, would decrease, and the volume in other portions of the reaction chamber would increase. This localized volume change causes a flow of liquid reagent 56 in the reaction chamber 60, thus agitating the liquid reagent 56.

In the embodiment of the invention shown in FIGS. 2, 3A, and 3B, the apparatus 100 of the invention includes a mechanical support 70 that aligns or registers the cover 50 with the microarray substrate 10 (see FIGS. 2 and 3A). In this embodiment, the mechanical support 70 includes a cover recess 72 that has dimensions to fit the cover 50. The cover 50, therefore, can be placed in this cover recess 72 so that the cover 50 is precisely located within about 50–250 microns in the mechanical support 70. Similarly, the mechanical support 70 includes a substrate pocket or recess 74 that aligns the substrate 10 over the cover 50 within the mechanical support 70. The microarray substrate 10 can be placed in the substrate pocket 74 and then affixed to the cover 50 by a clamp, set of dowel pins, or other device that registers the substrate 10 with the cover 50. The use of a mechanical support 70 with recesses dimensioned to the size of the cover 50 and substrate 10 can assist in locating the substrate 10 and the cover 50. In FIGS. 2, 3A, and 3B, the cover recess 72 and substrate pocket 74 are simply stepped areas of the mechanical support 70 designed to accommodate a rectangular cover 50 and a rectangular substrate 10.

In the embodiment depicted in FIGS. 2, 3A, and 3B, the deflector 62 is a reciprocating roller. The roller is driven by mechanisms which cause it to produce a normal force on the top surface 54 of the cover 50 (a force in the direction of arrow A). The roller can be a cylindrically-shaped roller that contacts the cover 50 along a line on the surface of the cover 50 or a ball-shaped roller that contacts the cover 50 at a single point. In addition, the roller of FIGS. 2, 3A, and 3B can move in a reciprocating motion back and forth across the surface of the cover 50. For instance, the roller can move in the direction of arrow B—B, as shown in FIGS. 2 and 3A, in the direction of arrow C—C, as shown in FIG. 2, or in a combination of these directions. Multiple rollers can be used to contact the cover 50.

In one embodiment, the normal force (in the direction of arrow A in FIGS. 2, 3A, and 3B) produced by the deflector 62 is in the range of about 1–20 newtons (N), which is sufficient to deflect a cover 50 made of glass, plastic and/or rubber, or entirely of plastic, by tens of microns at the point of contact of the deflector 62 and the cover 50. In one embodiment, both the top region 54 and gasket region 52 of the cover 50 deflect under these conditions, but most of the deflection occurs in the top region 52. The liquid reagent 56 is displaced under the cover 50 by this deflection, and as the roller 62 moves across the cover 50, there is displacement and agitation of the liquid reagent 56.

In FIGS. 2, 3A, and 3B, one or more arched leaf springs 80 can be rotated or placed over the substrate 10 and then used to apply a downward force to the substrate 10. The arched leaf springs 80, which are best seen in FIG. 3B, can be a substantially flat strip of metal, such as steel, bent into an arc. The arc can be attached to a spring support 82 on each of its ends, as shown in FIG. 3B. In operation, when an arched leaf spring 80 is positioned over the substrate 10 at an appropriate height, the spring deforms upward (in the direction of arrow A), which produces a downward force by the spring 80 on the substrate 10. In this embodiment, the cover recess 72 of the mechanical support 70 can be fitted with a sponge-like material that easily compresses upon application of a force by the springs 80. When the springs 80 are used to provide a downward force on the substrate 10 and cover 50, therefore, the sponge-like material will compress, thus allowing the cover 50 and substrate 10 to move downward and into contact with the roller 62.

In operation of one embodiment of the invention, the roller 62 can be fixed in location.

Upon application of a downward force on the substrate 10 by the arched leaf springs 80, the roller 62 applies an upward force to the cover 50. Upon application of the upward force by the roller 62, the cover 50 deforms, thus agitating the liquid reagent 62 within the reaction chamber 60. In this implementation of the invention, the roller 62 is kept stationary while the combination of the mechanical support 70, microarray substrate 10, and cover 50 are reciprocated in the direction of arrow B—B. The reciprocation can be over any suitable distance and at varying frequencies. In one embodiment, the distance of reciprocation can be about 10–30 mm and the frequency of reciprocation can be about 1 back-and-forth cycle in each ½–2 seconds. In other embodiments, the combination of the mechanical support 70, microarray substrate 10, and cover 50 can be fixed in location, and the roller 62 can be reciprocated.

Many variations to the apparatus 100 can be applied within the scope of the invention. In the embodiments described above, the cover 50 was filled upside-down for convenience of capturing the liquid reagent 56. In this embodiment, for instance, after the incubation process is completed, the liquid reagent 56 can be easily recovered by removing the microarray substrate 10 and pipetting the liquid reagent 56. Because the liquid reagent 56 can be expensive and, in some applications, can be reused, capturing liquid reagent 56 after incubation can be desirable. In other embodiments, however, the arrangement is effective with the microarray substrate 10 on the bottom and the cover 50 on the top, for example.

The mechanical support 70 can be sized to accommodate various sizes of covers 50 and substrates 10. The size of the substrate 10 or the spotted area 7 (FIG. 1A) on the substrate 10 can, for instance, vary widely. In some embodiments this spotted area 7 on a substrate 10, sometimes called an array-spot footprint, can be 18 mm×18 mm, 18 mm×36 mm, or 18 mm×54 mm. For each spotted area 7 of differing size, a cover 50 apportioned to fit that spotted area 7 can be used.

The mechanical support 70 of the apparatus 100, therefore, can include interchangeable fixture plates used to accommodate different sizes of substrates 10 and covers 50, with one fixture plate being used for each size of substrate 10 and cover 50. Alternately, the mechanical support 70 can have adjustable fixture plates that can be sized to accommodate substrates 10 and covers 50 of different sizes to accomplish the same thing.

The deflector 62 can also vary in different embodiments of the invention. In one embodiment, a roller as the deflector 62 can be replaced with a sliding contactor, for example. Such a sliding contactor can still, in one embodiment, move reciprocally over the surface of the cover 50. In other embodiments, a single deflector 62 can be move reciprocally up and down in the direction of arrow A of FIGS. 2, 3A, and 3B to alternatively apply a force to the cover 50 and then apply no force to the cover 50. The reciprocation of the deflector 62 in the direction of arrow A can therefore agitate the liquid reagent 62. In another embodiment, two or more deflectors 62 can be used to apply forces to the cover 50, and the deflectors 62 can reciprocate in the direction of arrow A or in the direction of arrow B—B.

The cover 50 can vary if geometry and material without changing the nature of the apparatus 100. The cover 50 in the embodiment of FIGS. 2, 3A, and 3B is rectangular in shape, although a circular, elliptical, or other geometry can be used. In one embodiment, such as that depicted in FIGS. 2, 3A, and 3B, the cover 50 can be a two-piece embodiment having a gasket region 52 and a top region 54. In other embodiments, a single piece can be used as the cover 50. For example, a one-piece polymer cap can be used as the cover 50. In still other embodiments, the function of the gasket region 52 of the cover 50 can be provided by a structure where the gasket portion of the cover 50 is permanently affixed to the microarray substrate 10. In this embodiment, only the top portion 54 of the cover 50 is removable from the microarray substrate 10. Microarray substrates with polymer coating, for instance, have been used as microarrays. In these embodiments, the polymer coatings can be fabricated with one or more openings to the surface of the substrate 10, with the openings having the target spots on the surface of the substrate 10. The substrate 10 can also be made of plastic, silicon, ceramic, metal, or other rigid material.

The gasket region 52 of the cover 50 can be designed in a variety of manners to accommodate the application. As indicated above, the gasket 52 can be permanently affixed to the top region 54, permanently affixed to the substrate 10, or it can be a separate component. The gasket can be shaped to accommodate the spotted area 7 (FIG. 1A) of the top surface 12 of the substrate 10. In one embodiment where the gasket 52 is a separate piece from the top region 54 or is affixed to the substrate 10, a groove can be formed in the top region 54 to accommodate the gasket 52 and aid in aligning the gasket 52 with the top region 53.

The cover 50 can be a stink-on cover 50 that uses an adhesive to attach to the substrate 10 or a clamp-on cover 50 that uses a camp to stay affixed to the substrate 10. Both stick-on covers 50 and clamp-on covers 50 allow or agitation of the liquid reagent 56 in operation. In one embodiment, however, a clamp-on cover 50 without adhesive can be desirable. The use of a clamp-on cover 50 can make it simpler to employ an integrated apparatus 100 where the apparatus 100 contains a device to automatically lift or remove the cover 50 after incubation. In an embodiment of the invention having an automated cover-removal function, the liquid reagent 56 can also be automatically recovered after incubation and cap removal by aspiration with a pipette. The cover 50 can be designed for single use or can be re-usable. A re-usable cover 50 can be built into the apparatus 100 of the invention such that it can be clamped to the substrate, used for a reaction, and then removed. In one embodiment, rigorous cleaning of the cover 50 between experiments can be carried out to prevent cross-contamination.

Any material can be use for the cover 50 that is chemically inert with respect to the liquid reagents 56 used in the reaction. Typical materials that are inert to most relevant reagents and are suitable for use in the cover 50 include glass, polypropylene, polyethylene, Teflon, silicone rubber, fluorosilicone, fluoroelastomer, and nitrile.

In one embodiment of the invention, the apparatus 100 can include automatic washing and drying of the incubated microarray. In this embodiment, after incubation and removal of the cover 50 from the substrate 10, wash solution can be jetted or flooded over the top surface 12 of the microarray substrate 10. After washing, the substrate 10 can be dried by vacuum or gas-stream drying with or without heat. Referring to FIG. 2, two ports 91 for washing liquid are shown. Washing liquid can be jetted from a pressurized source through these washing ports 91 to wash the substrate 10 after incubation. FIG. 2 also shows two drying ports 93. Air can be jetted through these drying ports 93 after a washing cycle to dry the substrate 10.

Another embodiment of the invention includes a device to control the temperature of the substrate 10 or the reaction chamber 60. Temperature control can aid incubation because affinity reactions are optimized at certain temperatures. For some reactions, temperature control can be generally required for incubation. In one embodiment, a block 95 of thermally conductive metal is placed against the back side of th microarray substrate 10, as shown in FIGS. 2, 3A, and 3B.

The block 95, therefore, is placed on the side of the substrate 10 opposite the cover 50 in this embodiment. A temperature control module can include the block 95 as well as temperature sensing and feedback-based control system (not shown in Figures). A sensor, for instance, can be placed on the substrate 10 or on the cover 50 to sense the temperature, and the temperature of the block 95 can be increased or decreased to achieve a desired temperature. Conduction of heat from the block 95 to the substrate 10, and then from the substrate 10 to the liquid reagent 56 within the reaction chamber 60, keeps the liquid reagent 56 within a few degrees Celsius of the block 95 during incubation. In another embodiment, the entire substrate 10 and cover 50 can be placed in a controlled thermal environment such as an oven-like thermally controlled enclosure, to provide for a temperature-controlled environment. In another embodiment, the temperature of the deflector 62 can be controlled to control the temperature of the liquid reagent 56 during incubation.

In some embodiments of invention, an array of mechanical supports 70 for multiple cover-substrate combinations can be built into a single apparatus 100. Such an array could allow a user to perform incubations for more than one microarray substrate 10 at a time. In such an embodiment, the temperature block 95 could be a single piece to extend over the entire array. In addition, the springs 80 could apply forces to the temperature block 95 rather than to the substrate 10. In FIGS. 2, 3A, and 3B, for instance, where only a single cover 50 and substrate 10 are depicted, the springs 80 apply forces to the temperature block 95, which then pushes downward on the substrate 10 and the cover 50.

Figure 4:
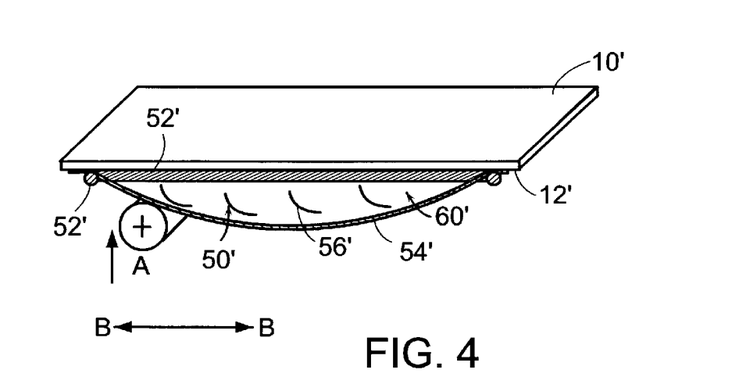
FIG. 4 is a perspective view of a second embodiment of an apparatus for incubating a liquid reagent with a microarray.
Figure 5:
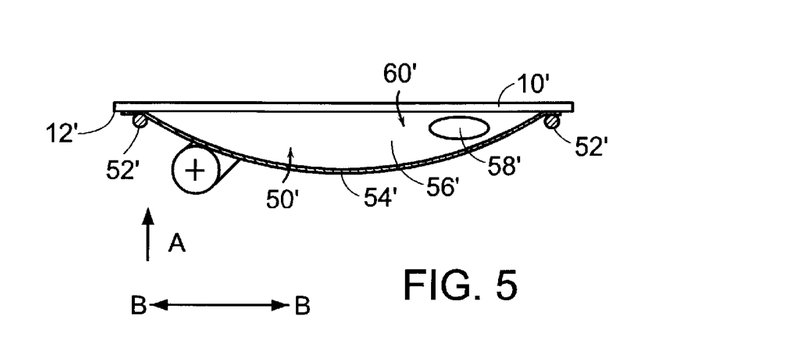
FIG. 5 is a side cross-sectional view of the embodiment of the apparatus of FIG. 4.

FIGS. 4 and 5 depict another embodiment of the invention. This embodiment shows a variation in the cover 50' that can be used in one embodiment of the invention. In FIGS. 4 and 5, components of the apparatus 100 equivalent to those in FIGS. 2, 3A, and 3B are designated by a prime (') notation. For simplicity, a mechanical support 70 such as that shown in FIGS. 2, 3A, and 3B is not shown in the embodiment of FIGS. 4 and 5. A mechanical support such as the type shown in FIGS. 2, 3A, and 3B can be used in this embodiment.

In the embodiment of FIGS. 4 and 5, the top region of the cover 50' is a sack 54' made from a single piece of rubber or plastic, or the like. The gasket 52' in this embodiment can be a ring or clamp that can be used to sealingly engage the sack 54' with the substrate 10' to form a reaction chamber 60'. The embodiment of FIGS. 4 and 5 can be used in the same manner as the embodiment of FIGS. 2, 3A, an 3B. The liquid reagent 56' can be placed in the sack 54', the substrate 10' can be placed over the sack 54' with the top surface 12' of the substrate 10' facing the sack 54', and the sack 54' can be sealed to the substrate 10' with the gasket 52' and/or the gasket 52' and an adhesive or a clamp. A deflector 62', such as a roller, can then be used to deform the sack 54' and agitate the liquid reagent 56' within the reaction chamber 60'. In addition, an amount of liquid reagent 56' can be placed within the sack 54' such that an air bubble 58' remains in the sack 54'. In operation, this air bubble 58' can aid in causing agitation of the liquid reagent 56' by allowing the liquid reagent 56' to easily move within the reaction chamber 60'.

Figure 6:
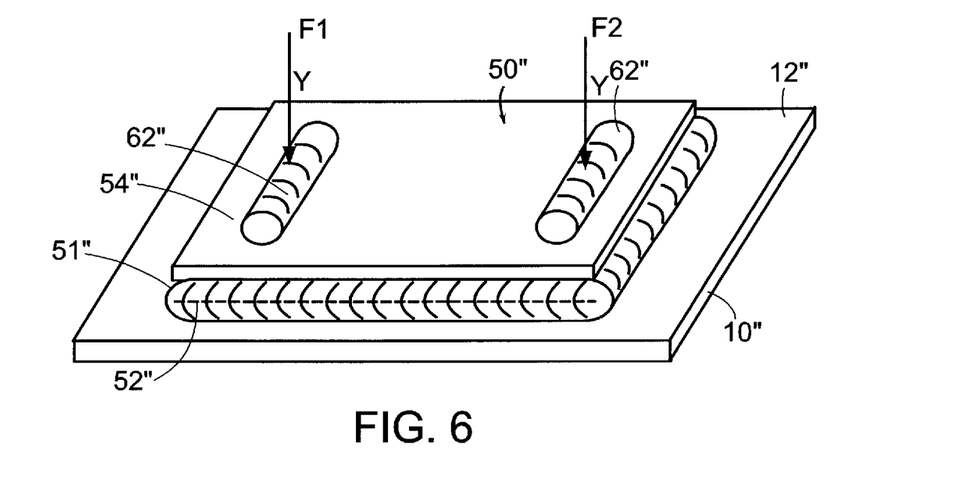
FIG. 6 is a perspective view of a third embodiment of an apparatus for incubating a liquid reagent with a microarray.
Figure 7:
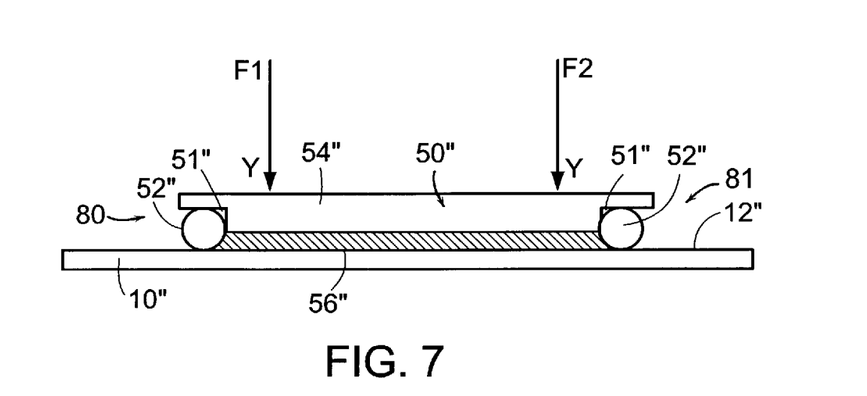
FIG. 7 is a side cross-sectional view of the embodiment of the apparatus of FIG. 6 in a first position.
Figure 8:
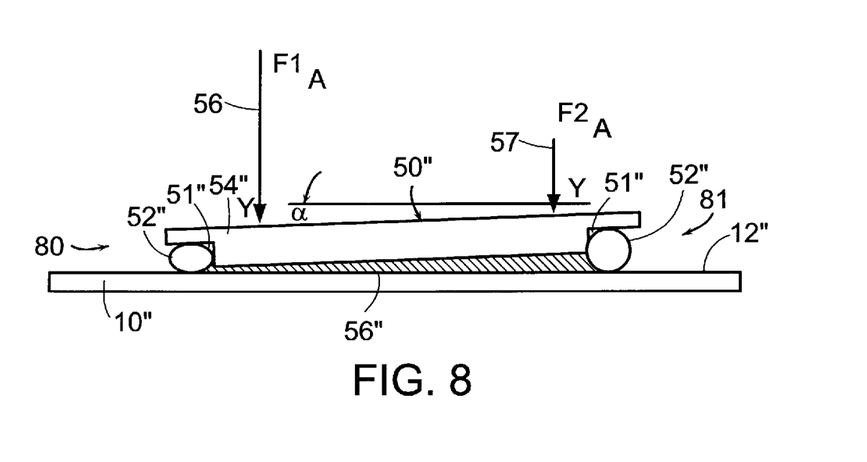
FIG. 8 is a side cross-sectional view of the embodiment of the apparatus of FIG. 6 in a second position for agitating the liquid reagent.

FIGS. 6–8 show another alternative embodiment of the invention for producing agitation of the liquid reagent 56" by deforming the cover 50". In this embodiment, an alternative cover 50" along with an alternative method of agitating the liquid reagent 56" is depicted. In FIGS. 6–8, components of the apparatus 10 equivalent to those in FIGS. 2, 3A, and 3B are designated by a double prime (") notation. For simplicity, a mechanical support 70 such as that shown in FIGS. 2, 3A, and 3B is not shown in the embodiment of FIGS. 6–8. A mechanical support such as the type shown in FIGS. 2, 3A, and 3B can be used in this embodiment.

In the embodiments of FIGS. 6–8, a microarray substrate 10" with immobilized target spots (not shown) on the top surface 12" of the substrate 10" has a cover 50" placed over it. In FIGS. 6–8, the cover 50" is shown above the substrate 10", but the orientation of the cover 50" and the substrate 10" can be interchanged or moved to intermediate locations in other embodiments. In the embodiment of FIGS. 6–8, the cover 50" includes a top 54" and a gasket 52". As seen in FIGS. 7 and 8, the top 54" of the cover 50" can contain a stepped region 51" around its edges in which the gasket 52" adjoins the top 54'. In other embodiments, this stepped region 51" need not be used. The gasket 52" is shown implemented in FIGS. 6–8 as an o-ring with a circular cross section, although gaskets with varying dimensions can be used in other embodiments.

In operation of the embodiment of FIGS. 6–8, a volume of liquid reagent 56" is confined between the cover 50" and the substrate 10". The liquid reagent 56" can be manually placed on the substrate 10" or on the cover 50" or, in another embodiment, the liquid reagent 56" can be applied to the substrate 10" or cover 50" automatically. Two forces F1 and F2 are applied to the cap. In FIGS. 6–8, the forces F and F2 are in the direction of arrow Y, which is substantially normal to the cover 50" and the substrate 10", but the forces F1 and F2 can also contain components in directions other than in the direction of arrow Y. FIG. 7 depicts an initial state of the cover 50" in which the forces F1 and F2 are substantially equal. In FIG. 7, the combined normal forces F1 and F2 are sufficient to compress the gasket 52" to effectively confine the liquid reagent 56" between the substrate 10" and the cover 50". In one embodiment, the gasket 52" compresses by approximately 25 percent upon the application of forces F1 and F2 to effectuate a seal between the cover 50 and the substrate 10. In this embodiment of the invention, the gasket 52" compresses more readily than the top region 54'. Upon application of forces F1 and F2, the top region 54" may deform or compress, but the gasket 52" compresses more readily and by a greater amount. In one embodiment, therefore, the top region 54" of the cover 50" remains substantially un-deformed and the deformation is substantially confined to the gasket 52".

FIG. 8 depicts a second state of the cover 50" over the substrate 10". In FIG. 8, force F1 from FIG. 7 has been increased to force $F1_A$ and force F2 from FIG. 7 has been decreased to force $F2_A$. Force $F1_A$ in FIG. 8 has therefore been depicted by a larger arrow in the Y direction than has force $F2_A$. The sum of the two forces $F1_A$ and $F2_A$ in FIG. 8 is substantially the same as the sum of the original equal forces F1 and F2 shown in FIG. 7. This substantially constant sum of forces keeps the gasket 52" compressed and sealed on the substrate 10" so that liquid reagent 56" does not escape during incubation. The difference between the forces $F1_A$ and $F2_A$ in FIG. 8 causes a differential compression of the gasket 52" between a first end 80 and a second end 81 of the cover 50". FIG. 8, for instance, depicts a tilt of the top region 54" of the cover 50" with respect to the substrate 10" by an angle α. The tilting of the top region 54" of the cover 50" by the angle α causes localized change in the volume under the cover 50" and produces gross flow of the liquid reagent 56" from left to right in FIG. 8. In other words, liquid reagent 56" flows from the first end 80 to the second end 8 between the conditions in FIG. 7 and FIG. 8.

In FIG. 8, the forces $F1_A$ and $F2_A$ can be interchanged, thus tilting the top region 54" of the cover 50" in the other direction and causing a gross flow of liquid reagent 56" from the second end 81 to the first end 80. This low of liquid reagent 56" between the cover 50" and the substrate 10" causes the agitation which can improve the reaction between the liquid reagent 56" and the target spots on the top surface 12" of the substrate 10". The shifting of the forces $F1_A$ and $F2_A$ from side to side can occur at a frequency, such as a shift in the forces $F1_A$ and $F2_A$ every second, to agitate the liquid reagent 56". In other variations of this embodiment of the invention, more than two forces F1 and F2 can be applied to the cover 50" to effectuate the agitation of the liquid reagent 56" in the manner described above.

This mechanism (not shown) used in FIGS. 6–8 to produce the forces F1 and F2 can be configured in many ways to provide the motion described. The forces F1 and F2 can be produced by solenoids, pneumatic or hydraulic cylinders, piezo-electric actuators, cams and plungers, or other mechanisms. In addition, the deflector 62" used to produce the forces F1 and F2 can be shaped in a variety of ways. FIG. 6, for instance, depicts a deflector 62" that is shaped as a cylindrical roller. In other embodiments, the deflector 62" can be shaped so that it applies a localized force at a point instead of along a line on the top region 54" of the cover 50" as shown in FIG. 6.

Experiments to verify the effectiveness of agitation conducted according to the embodiment of the invention of FIGS. 2, and 3B were conducted. A first experiment was performed using a substrate 10, cover 50, and a roller 62 to deform the cover 50, such as in the embodiment depicted in FIGS. 2, 3A, and 3B. A second experiment was performed using the same substrate 10 and cover 50 as in the first experiment, but with a different method of agitating liquid reagent on the substrate 10. The results of these experiments were compared to determine the effectiveness of agitation of liquid reagent in accordance with the invention.

The substrate 10 and cover 50 used for the experiments were as follows. It should also be noted that this particular substrate 10 and cover 50 are suitable for use in a number of embodiments of the invention. In the experiments, the microarray substrate 10 was a Telechem ArrayIt SuperAmine substrate made by Telechem International of Sunnyvale, Calif. The Telechem ArrayIt SuperAmine substrate is an optically flat glass printing surface cut to a dimension of 25 mm by 76 mm, polished to optical flatness, and its top surface is derivatized with active amine groups that allow stable attachment of target spots, such as cDNA. In the experiments, the cover 50 was an MJ Research Frame Seal #SLF-0601 made by MJ Research Inc. of Waltham, Mass. The MJ Research Frame Seal #SLF-0601 is a vapor-tight slide sealing chamber for in situ, PCR, FISH, and PRINS reactions. This cove 50 has an adhesive-backed frame (that is, a gasket 52) and a flexible plastic cover slip (that is, a top region 54). The adhesive-backed frame can be attached around the spotted area on the substrate 10, the liquid reagent 56 can be added within the frame seal, and then the flexible plastic cover slip can be sealed in place over the adhesive-baked frame to create a sealed reaction chamber 60. The outside dimensions of this cover 50 are 24 mm×24 mm, with a thickness of 0.4 mm. This thickness of 0.4 mm is the thickness of the top region 54 of the cover 50 along with the gasket region 52. The dimensions of the reaction chamber 60 between the substrate 10 and the cover 50 in his embodiment is 15 mm×15 mm, with a thickness of 0.3 mm. These dimensions of the reaction chamber 56 are equivalent to the dimensions inside the gasket region 52 of the cover 50.

To conduct the experiments, two separate drops of liquid reagent (each being 45 microliters) were placed on the cover 50. One of the drops of liquid reagent was labeled with a first fluorescent dye, Cy3, and the second drop of liquid reagent was labeled with a second fluorescent dye, Cy5. A microarray substrate 10 was then placed over the cover 50 and sealed as discussed above.

The first experiment was conducted according to the embodiment of the invention of FIGS. 2, 3A, and 3B. In this experiment, the deflector 62 was a roller made from a machined cylinder of stainless steel. The roller had a diameter of 12.7 mm and a length of 15 mm. In this experiment, the two arched leaf springs 80, as best seen in FIG. 3B, were rotated over the substrate 10 and then used to apply a downward force to the substrate 10. In this experiment, the downward force provided by the two springs was about 3 N. The springs 80 were made of full-hard 301 stainless steel and were 0.25 mm thick. The pieces of steel used for the arched leaf springs 80 were 4 mm wide and were approximately 34 mm long.

In this experiment, the combination of the mechanical support 70, microarray substrate 10, and cover 50 were reciprocated through a stroke length of about 22 mm at a frequency of about 1 second per back-and-forth cycle. This reciprocation was used to agitate the liquid reagent 56 within the reaction chamber 60.

In the first experiment, the substrate 10 with the attached cover 50 was scanned using a ScanArray 5000 microarray scanner (Packard BioChip, Billerica Mass.) before and after agitation using the roller 62. The scanning produced two images—one of each dye. The two images were superimposed to form a composite image where the Cy3 cye was displayed as green, the Cy5 dye was displayed as red, and mixed liquid reagents (Cy3 dye mixed with cy5 dye) were displayed as yellow. The yellow region in the composite image, therefore, indicated a region in which the liquid reagent having the Cy3 dye (green) and the liquid reagent having the Cy5 dye (red) intermixed. Before application of the reciprocating roller 62 in accordance with an embodiment of the invention, the composite images consistently showed distinct regions of green and red with little yellow at the interface between them. This indicated, therefore, that little mixing occurred between the liquid reagent having the Cy3 dye and the liquid reagent having the Cy5 dye. After 15 minutes of agitation with the roller 62 as described above, the assembly of the substrate 10 and the cover 50 was scanned again. The composite image was uniformly yellow, indicating that sufficient agitation had occurred to mix two completely heterogeneous regions of the liquid reagent.

In the second experiment, the same substrate 10 and cover 50 as in the first experiment was used. In addition, the same liquid reagents having dyes were used. To conduct this second experiment, a different method of agitation was used rather than deformation of the cover in accordance with embodiments of the invention. In order to perform this second experiment, two drops of liquid reagent, with one drop having Cu3 dye and the other having Cy5 dye, were placed on the cover, and the substrate was then affixed to the cover. In this experiment, an air bubble was left within the area between the substrate and the cover having the liquid reagent. The assembly of the substrate and the cover was then rotated for one hour so that the air bubble would agitate the liquid reagent. After one hour of rotisserie agitation, the two regions of Cy3 and Cy5 dye were still distinctly separate, and gross mixing had not yet occurred. The scanned image, therefore, showed only a partial yellow region between a red region and a green region.

The results of these two experiments generally indicate that the embodiment of the invention using a roller or other deflector 62 to deform a cover 50 in a reaction chamber 60 provides improved agitation of the liquid reagent 56 within the reaction chamber 60 compared to one other method of agitation.

The accompanying Figures depict embodiments of the methods and devices of the present invention, and features and components thereof. With regard to devices for fastening, mounting, clamping, attaching or connecting components of the present invention to form the invention as a whole or a subcomponent of the invention as a whole, unless specifically described otherwise, such devices are intended to encompass conventional fasteners such as machine screws, machine threads, seals, snap rings, clamps, rivets, nuts and bolts, toggles, pins and the like. Components may also be connected adhesively, by friction fitting, or by welding or deformation, if appropriate. Unless specifically otherwise disclosed or taught, materials for making components of the present invention may be selected from appropriate materials such as metal or metallic alloys, including steel and aluminum, ceramics, natural or synthetic materials, and plastics and the like, and appropriate manufacturing or production methods include casting, extruding, molding and machining.

Any references to front and back, right and left, top and bottom, upper and lower, and horizontal and vertical are, unless noted otherwise, intended for convenience of description, not to limit the present invention or its components to any one positional or spacial orientation. All dimensions of the components in the attached Figures may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. A method for incubating a liquid reagent with target spots on a first surface of a microarray substrate, comprising:
    confining the liquid reagent in a space between a deformable cover having a gasket and the first surface of the microarray substrate;
    applying at least first and second forces to the deformable cover, wherein the first and second forces compress the casket to seal the liquid reagent in the space; and
    altering the magnitude of the first and second forces to agitate the liquid reagent while maintaining as substantially constant a value equal to the sum of the first force and the second force so that the gasket maintains the seal of the liquid reagent in the space.

2. The method of claim 1, wherein the deformable cover includes a semi-rigid material.

3. The method of claim 1, wherein the deformable cover includes the gasket and a lid.

4. The method of claim 1, wherein at least one air bubble exists in the space between the deformable cover and the first surface of the substrate.

5. An apparatus for incubating a liquid reagent with target spots on a first surface of a microarray substrate, comprising:
    means for confining the liquid reagent in a space between a deformable cover having a gasket and the first surface of the substrate;
    means for applying at least first and second forces to the deformable cover, wherein the first and second forces compress the gasket to seal the liquid reagent in the space; and
    means for altering the magnitude of the first and second forces to agitate the liquid reagent while maintaining as substantially constant a value equal to the sum of the first force and the second force so that the gasket maintains the seal of the liquid reagent in the space.

6. The apparatus of claim 5, further comprising:
    means for dispensing the liquid reagent in the space.

7. The method of claim 1, further comprising varying a location on the deformable cover on which the first force is applied.

8. The method of claim 7, further comprising varying a location on the deformable cover on which the second force is applied.

9. The method of claim 1, wherein confining the liquid reagent includes:
    placing the liquid reagent on the deformable cover; and
    placing the first surface of the substrate having the target spots over the deformable cover such that the deformable cover surrounds the target spots.

10. The method of claim 9, wherein placing the liquid reagent on the deformable cover includes manually dispensing the liquid reagent.

11. The method of claim 9, wherein placing the liquid reagent on the deformable cover includes automatically dispensing the liquid reagent.

12. The method of claim 9, wherein placing the first side of the substrate over the deformable cover includes manually placing the substrate.

13. The method of claim 9, wherein placing the first side of the substrate over the deformable cover includes automatically placing the substrate.

14. The method of claim 1, further comprising controlling the temperature of the substrate.

15. The method of claim 14, wherein controlling the temperature includes placing a temperature control block over the substrate.

16. The method of claim 1, further comprising introducing an air bubble within the space.

17. The method of claim 16, wherein altering the magnitude of the first and second forces causes the air bubble to agitate the liquid reagent.

18. The method of claim 1, wherein applying at least first and second forces includes using rollers to apply the forces.

19. The method of claim 18, further comprising rolling the rollers over the deformable cover to alter locations on the deformable cover on which the forces are applied.

20. The method of claim 1, further comprising allowing at least one reaction between one of the target slots on the substrate and the liquid reagent to occur.

21. The method of claim 20, wherein the reaction is selected from the group consisting of hybridization, protein binding, immunoassays, and chemical binding.

22. The method of claim 20, further comprising at least partially removing the deformable cover from the substrate.

23. The method of claim 22, further comprising washing from the substrate the liquid reagent that has not reacted with the target spots.

24. The method of claim 23, further comprising drying the substrate.

25. The apparatus of claim 5, further comprising a temperature control block having a surface to engage the substrate.

26. The apparatus of claim 5, further comprising a washer to wash the liquid reagent that has not reacted with the target spots from the substrate.

27. The apparatus of claim 26, further comprising a dryer to dry the substrate.

28. The apparatus of claim 5, wherein the deformable cover comprises a material selected from the group consisting of glass, polypropylene, polyethylene, Teflon silicone rubber, fluorosilcone, fluoroelastomer, or nitrile.

* * * * *

UNITED STATES PATENT AND TRADEMARK OFFICE
CERTIFICATE OF CORRECTION

PATENT NO. : 6,485,918 B1
DATED : November 26, 2002
INVENTOR(S) : Mack J. Schermer et al.

It is certified that error appears in the above-identified patent and that said Letters Patent is hereby corrected as shown below:

Column 13,
Line 50, "casket" should be corrected as -- gasket -- and

Column 14,
Line 50, "slots" should be corrected as -- spots --.

Signed and Sealed this

Eighth Day of April, 2003

JAMES E. ROGAN
*Director of the United States Patent and Trademark Office*